(No Model.)
C. A. KETCHAM.
ANIMAL TRAP.
No. 285,754. Patented Sept. 25, 1883.
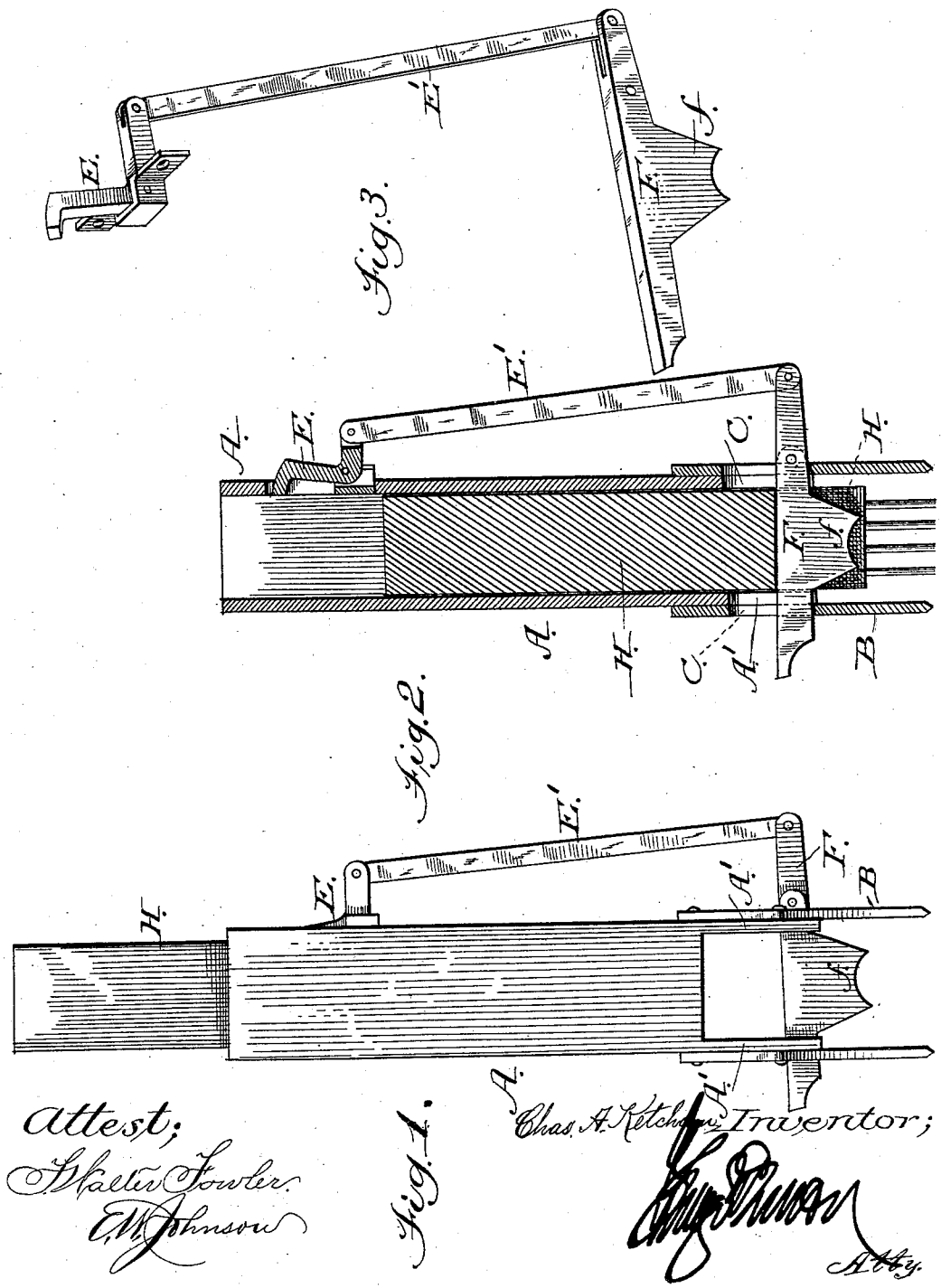

UNITED STATES PATENT OFFICE.

CHARLES A. KETCHAM, OF COLD SPRING, INDIANA.

ANIMAL-TRAP.

SPECIFICATION forming part of Letters Patent No. 285,754, dated September 25, 1883.

Application filed July 7, 1883. (No model.)

*To all whom it may concern:*

Be it known that I, CHARLES A. KETCHAM, a citizen of the United States of America, residing at Cold Spring, in the county of Dearborn and State of Indiana, have invented certain new and useful Improvements in Animal-Traps; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of this invention is to provide a cheap, simple, and effective trap which is to be placed over mole and gopher runs for the purpose of destroying the animals; and my invention is designed more especially as an improvement upon patents issued to T. J. Brown, No. 133,407, dated November 26, 1872; T. Wilson, No. 225,251, dated March 9, 1880, and H. W. Hales, No. 238,538, dated March 8, 1881, the object of said improvement being to obviate certain defects, as will be hereinafter more fully set forth.

In the accompanying drawings, which illustrate my invention, Figure 1 is a side elevation of the trap, showing the same in position. Fig. 2 is a sectional view of the trap after it is sprung. Fig. 3 is a detailed perspective view of the trigger.

A represents the cylinder, which is preferably rectangular in cross-sections, the sides A' being somewhat longer than the other two sides. These sides A' are bifurcated at their lower end, and are provided over said bifurcations with slotted points, which extend below the same, and are firmly secured to the sides, as will be fully understood from the accompanying drawings.

To one side of the case A, above one of the points or feet B, the same is provided with a slot, C, through which passes the catch E, which is secured to the case by a suitable pivot or plate, which may be attached thereto. This catch E is connected to the trigger by the bar E'.

The trigger F extends through the slot in the feet B and the bifurcated portion of the sides of the case, so as to project laterally on each side of the same; and it is pivoted near one end either to one of the feet B, which may be provided with outwardly-projecting flanges, to the edge of the slot, or to the side of the case, as may be desirable. This trigger is also pivoted at one end to the connecting-bar E.

The trigger F, hereinbefore described, is provided with a downwardly-projecting portion, *f*, the lower portion of which is concave.

H represents a block of considerable weight, the lower end of which is bifurcated, and provided with handles *a a*. This block is placed within the casing A, as will be fully understood from the accompanying drawings.

When it is desirable to set my improved trap, the same is placed over the run or track, the feet B being placed on each side of the same, and the downwardly-projecting portion *f* of the trigger F is placed over the center of the track, and the same is pressed into the ground until the lower portion of the trigger is a little below the top of the run. The projecting end of the trigger is then pressed downwardly, preferably by the foot, until the catch at the upper end of the trap projects inwardly sufficiently to hold the fall. When the trap is thus set, the mole or gopher, in passing through the run, comes in contact with the lower part of the trigger, and in attempting to pass under the same raises it, and thereby releases the fall, the needles of which pass through the animal.

Prior to my invention, as shown in the patent of Brown, hereinbefore referred to, a fall has been provided which slid upon a standard, which was released by a trigger which extended over the run. In this case the fall is liable to clamp upon the standard, owing to the weight being unequally distributed, and the needles are not protected. In the case of Wilson the fall is also liable to bind, and the same remarks are equally applicable to the patent of Hales.

It will be noticed that heretofore the needles have been exposed and the trap is liable to be unset. By my construction the fall cannot bind, the needles are protected, and I also provide an improved form of trigger.

It will be noticed that by bifurcating the lower end of the fall and securing the trigger to the central part of the casing when the trap is unset, the fall will rest upon the trigger and cannot slide out of the casing through the lower end of the same, and the trigger, resting within slots, is securely held against injury when the weighted fall descends upon the same.

Having thus described my invention and fully acknowledged the state of the art, what I claim as new, and desire to secure by Letters Patent, is—

1. In combination with the casing A, provided with extended sides A' A', the slotted feet B, extending below the same, the fall H, cut away at its central lower portion, and provided with needles, the trigger F, connecting-bar E', and latch E, the parts being organized and combined substantially as shown, and for the purpose set forth.

2. In combination with the fall H, casing A, and releasing means, the trigger F, provided with a downwardly-extending portion, said trigger extending through the frame so as to project on each side of the casing, substantially as shown.

In testimony whereof I affix my signature in presence of two witnesses.

CHARLES A. KETCHAM.

Witnesses:
WILL A. WHEELER,
LEVIN P. CHANCE.